United States Patent
Chen

(10) Patent No.: US 8,166,329 B2
(45) Date of Patent: Apr. 24, 2012

(54) CIRCUIT FOR FACILITATING COMPUTER SYSTEM WAKING UP FROM SLEEP STATE

(75) Inventor: Qi-Jie Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 468 days.

(21) Appl. No.: 12/508,178

(22) Filed: Jul. 23, 2009

(65) Prior Publication Data
US 2010/0306562 A1    Dec. 2, 2010

(30) Foreign Application Priority Data
Jun. 2, 2009    (CN) .......................... 2009 1 0302848

(51) Int. Cl.
*G05F 1/10*    (2006.01)
*G05F 1/40*    (2006.01)

(52) U.S. Cl. ........ 713/324; 713/300; 713/323; 323/224; 323/274; 323/282; 323/284

(58) Field of Classification Search ................. 713/300, 713/323–324; 323/224, 274, 282, 284
See application file for complete search history.

(56) References Cited

U.S. PATENT DOCUMENTS

| | | | | |
|---|---|---|---|---|
| 7,061,213 | B2 * | 6/2006 | Yoshida | 323/224 |
| 7,609,042 | B2 * | 10/2009 | Kokubun et al. | 323/284 |
| 2002/0021539 | A1 * | 2/2002 | Odaohhara et al. | 361/103 |
| 2005/0057238 | A1 * | 3/2005 | Yoshida | 323/282 |
| 2007/0069703 | A1 * | 3/2007 | Kokubun et al. | 323/282 |
| 2009/0184699 | A1 * | 7/2009 | Natsume et al. | 323/282 |
| 2009/0315523 | A1 * | 12/2009 | Kumagai et al. | 323/272 |

* cited by examiner

*Primary Examiner* — M Elamin
(74) *Attorney, Agent, or Firm* — Altis Law Group, Inc.

(57) ABSTRACT

A circuit for a computer system, includes a pulse width module (PWM) module and a control circuit. The PWM module is capable of converting a first voltage to a second voltage. The first voltage is capable of decreasing slower than the second voltage to have the PWM module entering in an unwanted state when the computer system is changed from a first state to a second state. The PWM module includes a disabling pin capable of locking the PWM module when a voltage of the disabling pin is low. The control circuit includes a control pin connected to the disabling pin, a ground pin connected to ground, and a monitoring pin capable of monitoring the computer system being changed from a first state to a second state to control the control pin and the ground pin to pull the disabling pin low to lock the PWM module to prevent the PWM module from entering in the unwanted state.

12 Claims, 2 Drawing Sheets

CIRCUIT FOR FACILITATING COMPUTER SYSTEM WAKING UP FROM SLEEP STATE

BACKGROUND

1. Technical Field

The present embodiment relates to electronic circuits, and particularly to an electronic circuit for facilitating a computer system when waking up from a sleep state.

2. Description of Related Art

A conventional computer system has a power supply which converts an alternating current (AC) signal (120 VAC, 60 Hz, as commonly found in the United States) to appropriate direct current (DC) signals required for the operation of a motherboard of the computer system. For raising a conversion efficiency of the power, a DC/DC converter is used in the computer system, as disclosed in U.S. Pat. No. 7,547,996.

In another aspect, for saving power, computers are increasingly conforming to the Advanced Configuration and Power Interface (ACPI) specification. The ACPI defines different processor power states, such as a normal state C0, and sleep states C1, C2, and C3. For example, when in C0 state, a CPU can execute instructions or move data. After the computer has been idle for a predetermined period, the CPU enters one of the sleep states C1, C2 or C3 in which power is saved. The sleep state C3 offers improved power saving over the sleep states C1 and C2. The sleep state C2 offers improved power saving over the sleep state C1.

However, when the computer system enters into the sleep state C3, the DC/DC converter often wrongly enters into an under voltage protection state if an input of the DC/DC converter decreases slower than an output of the DC/DC converter decreases. When the DC/DC converter enters into the under voltage protection, the computer system cannot be woken up to the normal state C0 from the sleep state C3.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
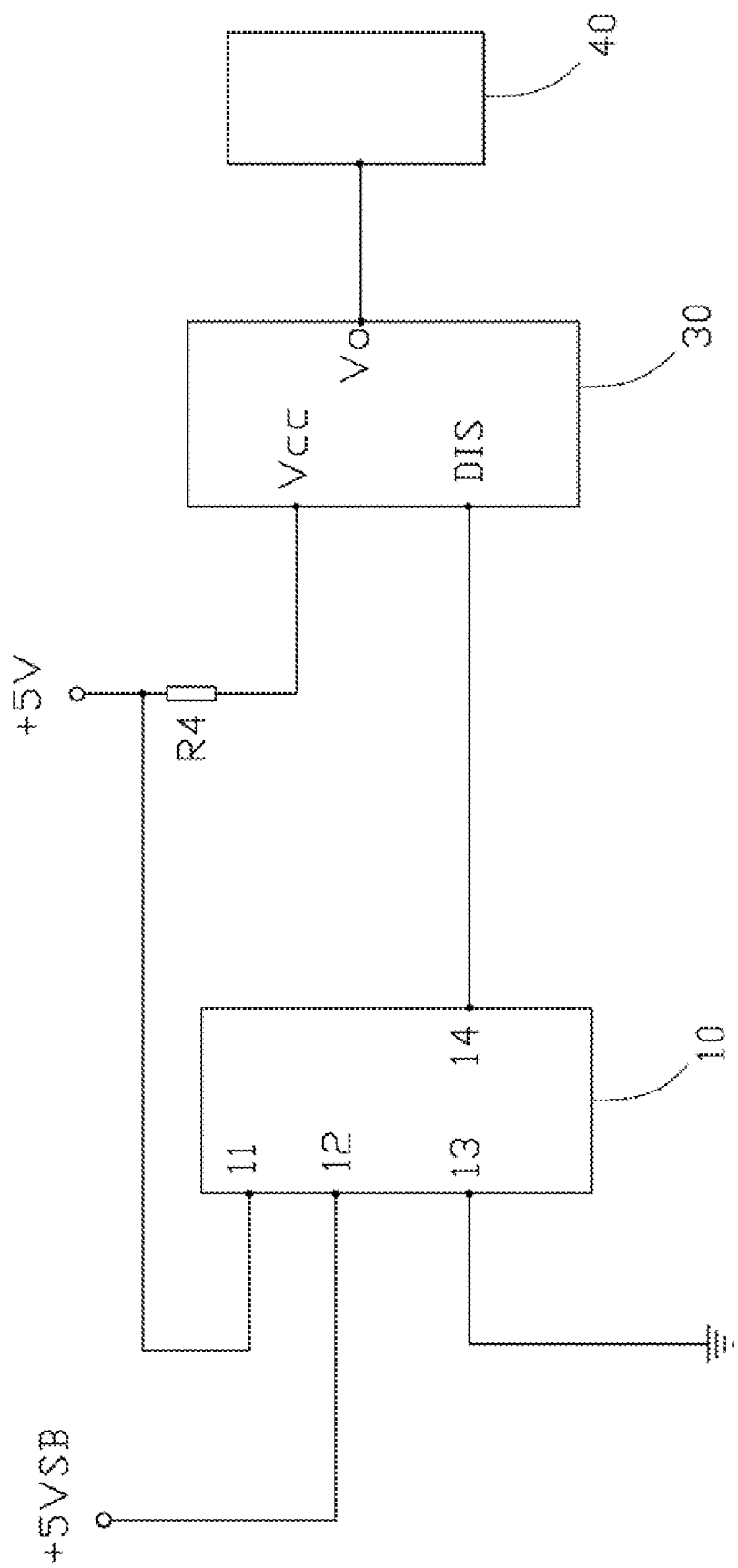
FIG. 1 is a block diagram of an embodiment of a circuit for facilitating computer system normally waking up from sleep state.

Referring to FIG. 1, a circuit for facilitating a computer system normally waking up from sleep state in accordance with an exemplary embodiment includes a control circuit 10 and a direct current to direct current (DC/DC) converter 30. In the embodiment, the DC/DC converter 30 is a pulse-width module, whose model number is L6728ATR.

The pulse width module 30 includes a voltage input pin Vcc, a voltage output pin Vo, and a disabling pin DIS. The voltage input pin Vcc is connected to a power supply of the computer system for receiving a +5V normal voltage. When the computer system enters into a sleep state, such as a C3 sleep state, the +5V normal voltage decreases. The pulse width module 30 converts the +5V voltage into a +1.125V voltage, and outputs it to a north bridge chipset 40 via the voltage output pin Vo. The disabling pin DIS is used to lock the pulse width module 30. When a voltage of the disabling pin DIS is low, the pulse width module 30 is locked to maintain the current state. The disabling pin DIS is connected to the control circuit 10.

The control circuit 10 includes a monitoring pin 11, a power source pin 12, a ground pin 13, and a control pin 14. The monitoring pin 11 is connected to the +5V normal voltage to monitor a state change of the computer system. For example, when the computer system is changed from the normal state C0 to the sleep state (C1, C2, or C3), the +5V normal voltage decreases and a voltage of the monitoring pin 11 becomes low. The power source pin 12 is connected to the power supply of the computer system for receiving a +5V standby voltage. Even if the computer system enters into any of the sleep states (C1, C2, or C3), the power supply still provides the +5V standby voltage. The ground pin 13 is connected to ground. The control pin 14 is connected to the disabling pin DIS of the pulse width module 30.

When the monitoring pin 11 of the control circuit 10 notices the computer system is changed from the normal state C0 to the sleep state (C1, C2, or C3), the control circuit 10 controls the ground pin 13 and the control pin 14 conduction. The control pin 14 is then grounded and the voltage of the disabling pin DIS is set low. The pulse width module 30 is then locked to prevent the pulse width module 30 from entering into the under voltage protection state. Therefore, the computer system can return to the normal state C0 when the computer system is woken up.

Figure 2:
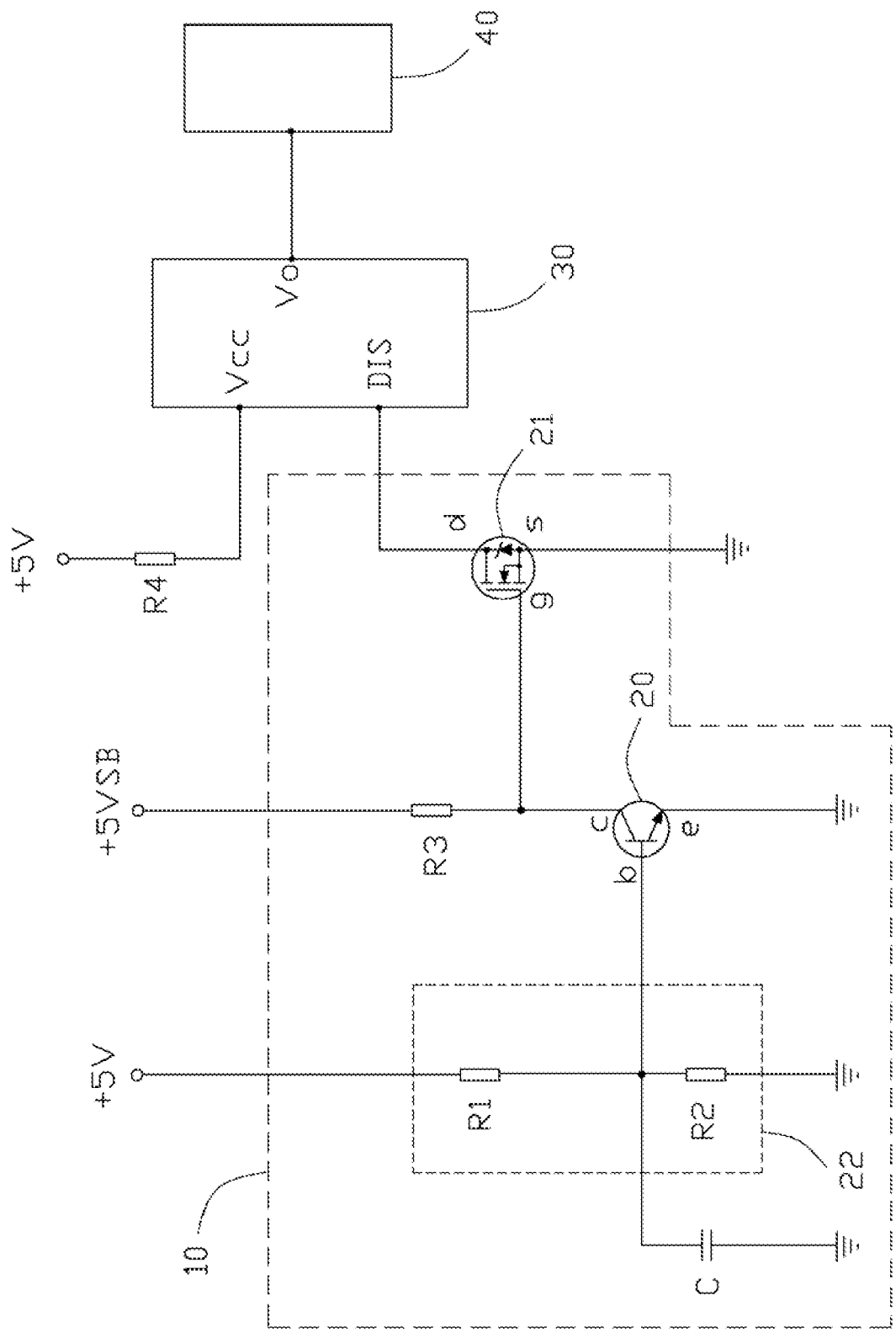
FIG. 2 is a circuit diagram of the circuit of FIG. 1.

Referring to FIG. 2, a detailed view of the control circuit 10 connected to the pulse width module 30 is shown. The control circuit 10 includes a first switch 20, a second switch 21, and a voltage-divider circuit 22.

In the embodiment, the first switch 20 is a Negative-Positive-Negative (NPN) bipolar junction transistor (BJT) type transistor. A base of the transistor 20 works as an input end of the first switch 20, and a collector of the transistor 20 works as an output end of the first switch 20. The base of the transistor 20 is connected to the +5V normal voltage via the voltage-divider circuit 22. The voltage-divider circuit 22 includes a first resistor R1 and a second resistor R2. An end of the first resistor R1 works as the monitoring pin 11 of the control circuit 10, and is connected to the +5V normal voltage. The other end of the first resistor R1 is connected to an end of the second resistor R2 and the base of the transistor 20. The other end of the second resistor R2 is connected to ground. A filter capacitor C is connected between the base of the transistor 21 and ground. The collector of the transistor 20 is connected to the +5V standby voltage via a third resistor R3. An emitter of the transistor 20 is connected to ground.

In the preferred embodiment, the second switch 21 is an N-Channel metal oxide semiconductor field effect transistor (N-Channel MOSFET). A gate of the N-Channel MOSFET 21 works as an input end of the second switch 21, and is connected to the collector of the transistor 20. A drain of the N-Channel MOSFET 21 works as an output end of the second switch 21, and also works as the control pin 14 of the control circuit 10. The drain is connected to disabling pin DIS of the PWM controller 30. A source of the N-Channel MOSFET 21 works as the ground pin 13 of the control circuit 10, and is connected to ground.

When the computer system is changed from the normal state C1 into the sleep state (C1, C2, or C3), the +5V normal voltage decreases, and the +5V standby voltage is still maintained. When a voltage on the base of the transistor 20 is lower than the turn on voltage of the transistor 20, such as +0.7V, the transistor 20 is off. The gate of the N-Channel MOSFET 21 becomes high to turn on the N-Channel MOSFET 21. The drain of the N-Channel MOSFET 21 is connected to ground, and the voltage of the disabling pin DIS becomes low to lock the PWM controller 30. Therefore, the PWM controller 30 cannot enter into the under voltage protection state, and can return to the normal state C0 when the computer system is woken up.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A circuit for a computer system, comprising:
   a pulse width module (PWM) module capable of converting a first voltage to a second voltage, the first voltage being capable of decreasing slower than the second voltage decreasing to have the PWM module entering in an unwanted state when the computer system is changed from a first state to a second state, the PWM module comprising a disabling pin capable of locking the PWM module when a voltage of the disabling pin is low; and
   a control circuit comprising a control pin connected to the disabling pin, a ground pin connected to ground, and a monitoring pin capable of monitoring the computer system being changed from the first state to the second state to control the control pin and the ground pin to pull the disabling pin low to lock the PWM module to prevent the PWM module from entering in the unwanted state.

2. The circuit of claim 1, wherein the first state is a normal state, and the second state is a sleep state, and the unwanted state is an under voltage protection state.

3. The circuit of claim 2, wherein the control circuit further comprises a power source pin, the power source pin is connected to a standby voltage which is maintained when the computer system enters in the second state.

4. The circuit of claim 3, wherein the control circuit comprises a Negative-Positive-Negative (NPN) bipolar junction transistor (BJT) type transistor and a N-channel metal oxide semiconductor field effect transistor (N-Channel MOSFET); an emitter of the NPN BJT type transistor is connected to ground, a base of the NPN BJT type transistor is connected to the first voltage via a voltage-divider circuit and works as the monitoring pin; a gate of the N-Channel MOSFET and a collector of the NPN BJT type transistor are connected to the standby voltage and work as the power source pin, a source of the N-Channel MOSFET is connected to ground and works as the ground pin, and a drain of the N-Channel MOSFET is connected to the disabling pin and works as the control pin.

5. The circuit of claim 4, wherein the voltage-divider circuit includes a first resistor and a second resistor, an end of the first resistor is connected to the first voltage, the other end of the first resistor is connected to an end of the second resistor and the base of the NPN BJT type transistor, the other end of the second resistor is connected ground.

6. The circuit of claim 5, wherein a filter capacitor is connected between the base of the NPN BJT type transistor and ground.

7. The circuit of claim 1, wherein the monitoring pin is connected to the first voltage to monitor the first voltage decreasing.

8. A circuit for a computer system, comprising:
   a PWM module capable of converting a first voltage to a second voltage, the first voltage being capable of decreasing slower than the second voltage to have the PWM module entering in an unwanted state when the computer system is changed from a first state to a second state, the PWM module comprising a disabling pin capable of locking the PWM module; and
   a first switch and a second switch, the first switch comprising an input end and an output end, the second switch comprising an input end and an output end, a standby voltage, which is maintained when the computer system enters in the second state, providing power to the second switch, the output end of the first switch connected to the input end of the second switch, the output end of the second switch connected to the disabling pin, the input end of the first switch capable of monitoring the computer system being changed from the first state to the second state to control the output end of second switch, thereby locking the PWM module to prevent the PWM module from entering in the unwanted state.

9. The circuit of claim 8, wherein the first state is a normal state, and the second state is a sleep state, and the unwanted state is an under voltage protection state.

10. The circuit of claim 8, wherein the first switch is a Negative-Positive-Negative (NPN) bipolar junction transistor (BJT) type transistor, the second switch is a N-channel metal oxide semiconductor field effect transistor (N-Channel MOSFET); an emitter of the NPN BJT type transistor is connected to ground, a base of the NPN BJT type transistor works as the input end of the first switch, and is connected to the first voltage via a voltage-divider circuit, a collector of the NPN BJT type transistor works as the output of the first switch; a gate of the N-Channel MOSFET works as the input end of the second switch, and is connected to the standby voltage, a drain of the N-Channel MOSFET works as the output end of the second switch.

11. The circuit of claim 10, wherein the voltage-divider circuit includes a first resistor and a second resistor, an end of the first resistor is connected to the first voltage, the other end of the first resistor is connected to an end of the second resistor and the base of the NPN BJT type transistor, the other end of the second resistor is connected ground.

12. The circuit of claim 11, wherein a filter capacitor is connected between the base of the NPN BJT type the transistor and ground.

* * * * *